(12) United States Patent
Thysell et al.

(10) Patent No.: US 10,946,318 B2
(45) Date of Patent: Mar. 16, 2021

(54) FILTER PANEL WITH STRUCTURES SUPPORT GRID AND DRUM FILTER WITH SAID FILTER PANEL

(71) Applicant: Veolia Water Solutions & Technologies Support, Saint Maurice (FR)

(72) Inventors: Filip Thysell, Trelleborg (SE); Emil Svensson, Trelleborg (SE); Kjell-Ake Svensson, Limhamn (SE); Per Larsson, Trelleborg (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 296 days.

(21) Appl. No.: 15/738,144

(22) PCT Filed: Jun. 21, 2016

(86) PCT No.: PCT/EP2016/064272
§ 371 (c)(1),
(2) Date: Dec. 20, 2017

(87) PCT Pub. No.: WO2016/207143
PCT Pub. Date: Dec. 29, 2016

(65) Prior Publication Data
US 2018/0178147 A1    Jun. 28, 2018

(30) Foreign Application Priority Data

Jun. 23, 2015  (SE) .................................... 1550862-5

(51) Int. Cl.
*B01D 33/23*   (2006.01)
*B01D 33/067*  (2006.01)
(Continued)

(52) U.S. Cl.
CPC .......... *B01D 33/23* (2013.01); *B01D 25/215* (2013.01); *B01D 29/05* (2013.01); *B01D 33/067* (2013.01);
(Continued)

(58) Field of Classification Search
None
See application file for complete search history.

(56) References Cited

U.S. PATENT DOCUMENTS

| 1,746,409 A | 12/1926 | Sweetland et al. |
| 2,910,183 A * | 10/1959 | Hayes ...................... B30B 9/26 |
| | | 210/315 |

(Continued)

FOREIGN PATENT DOCUMENTS

| CA | 679452 A | 2/1964 |
| CL | 214 | 10/2007 |

(Continued)

*Primary Examiner* — Robert J Popovics
(74) *Attorney, Agent, or Firm* — Coats & Bennett PLLC

(57) ABSTRACT

The invention relates to a filter panel (1) for a drum filter (2) which is used for filtering off solid particles from a liquid. The filter panel (1) comprises a first side (3) being adapted to be attached to a drum (4) of said drum filter (2), a second side (5) being adapted to receive a filter cloth (6), and a plurality of through holes (7) extending from said first side (3) to said second side (5), each hole (7) defining one or more side walls (8). The filter panel (1) is characterized in that at least one of said holes (7) comprises an inclined side wall (8). The invention also relates to a drum filter (2) for filtering liquid.

5 Claims, 3 Drawing Sheets

(51) Int. Cl.
*B01D 29/05* (2006.01)
*B01D 25/21* (2006.01)
*B01D 33/21* (2006.01)
*B01D 33/82* (2006.01)
*B01D 33/50* (2006.01)

(52) U.S. Cl.
CPC .............. *B01D 33/21* (2013.01); *B01D 33/50* (2013.01); *B01D 33/82* (2013.01); *B01D 2201/282* (2013.01)

(56) References Cited

U.S. PATENT DOCUMENTS

| | | | |
|---|---|---|---|
| 2,964,194 A | 12/1960 | Oliver, Jr. et al. | |
| 3,145,164 A | 8/1964 | Jonkman | |
| 3,150,082 A * | 9/1964 | Rich | B01D 33/073 210/395 |
| 3,235,086 A * | 2/1966 | Krynski | B01D 33/048 210/404 |
| 3,428,184 A * | 2/1969 | Kuper | B01D 25/001 210/489 |
| 3,561,603 A * | 2/1971 | Salomon | D21D 5/02 210/415 |
| 3,623,614 A | 11/1971 | Schmidt, Jr. | |
| 3,773,614 A | 11/1973 | Pennington | |
| 3,794,178 A * | 2/1974 | Luthi | B01D 33/067 210/404 |
| 4,038,187 A | 7/1977 | Saffran | |
| 4,309,284 A * | 1/1982 | Morimoto | D21D 5/026 209/273 |
| 4,316,803 A | 2/1982 | Kupf et al. | |
| 4,343,698 A * | 8/1982 | Jackson | B01D 35/06 210/107 |
| 4,370,231 A * | 1/1983 | Lavalley | B01D 33/465 210/404 |
| 4,581,139 A * | 4/1986 | Kosonen | B01D 33/067 210/232 |
| 4,676,893 A * | 6/1987 | Travade | B01D 33/067 210/157 |
| 4,790,935 A * | 12/1988 | Johnson | B01D 29/39 210/232 |
| 4,795,560 A * | 1/1989 | Chupka | B01D 29/111 210/497.01 |
| 4,885,090 A * | 12/1989 | Chupka | B01D 29/111 210/497.01 |
| 5,064,537 A * | 11/1991 | Chupka | B23K 26/384 210/497.01 |
| 5,244,572 A * | 9/1993 | McAllister | B01D 33/073 210/402 |
| 5,300,225 A * | 4/1994 | Fischer | B01D 36/04 210/391 |
| 5,326,471 A * | 7/1994 | Pietzsch | B07B 1/48 210/402 |
| 5,330,644 A * | 7/1994 | Nilsson | B01D 33/23 210/323.1 |
| 5,385,669 A * | 1/1995 | Leone, Sr. | B07B 1/48 210/488 |
| 5,407,563 A * | 4/1995 | Blake | B01D 33/067 210/155 |
| 5,558,042 A * | 9/1996 | Bradley | A01K 63/045 119/226 |
| 5,566,611 A * | 10/1996 | Scheucher | B30B 9/121 100/127 |
| 5,685,983 A * | 11/1997 | Frykhult | B01D 33/11 210/393 |
| 5,759,397 A * | 6/1998 | Larsson | B01D 33/073 210/331 |
| 5,798,039 A * | 8/1998 | Wiesemann | B01D 33/067 210/232 |
| 5,897,788 A * | 4/1999 | Ketolainen | B01D 33/073 210/784 |
| 6,000,557 A * | 12/1999 | Ku | B01D 33/073 210/391 |
| 6,022,474 A * | 2/2000 | MacKelvie | B01D 29/356 210/170.01 |
| 6,033,564 A * | 3/2000 | Kirker | B04B 7/085 210/232 |
| 6,090,298 A * | 7/2000 | Weis | B01D 33/21 210/331 |
| 6,318,565 B1 * | 11/2001 | Diemer | B01D 29/012 210/499 |
| 6,500,344 B1 * | 12/2002 | Lee | B01D 24/08 210/744 |
| 8,113,357 B2 * | 2/2012 | Johnson | B07B 1/4645 209/397 |
| 8,800,778 B2 * | 8/2014 | Neubauer | B01D 29/035 209/274 |
| 9,050,607 B2 * | 6/2015 | Heley | B04B 7/16 |
| 9,511,311 B2 * | 12/2016 | Bugg | C02F 1/001 |
| 9,694,390 B1 * | 7/2017 | Tsutsumi | B07B 1/24 |
| 9,908,150 B2 * | 3/2018 | Lipa | B07B 1/4609 |
| 9,968,872 B2 * | 5/2018 | Carayon | B01D 33/073 |
| 10,086,408 B2 * | 10/2018 | Cady | B07B 1/04 |
| 10,293,284 B1 * | 5/2019 | Holindrake | B01D 33/463 |
| 10,309,148 B2 * | 6/2019 | Glover | E06B 3/221 |
| 10,391,429 B2 * | 8/2019 | Carayon | E03F 5/14 |
| 10,543,987 B2 * | 1/2020 | Gundlach | B65G 15/30 |
| 10,549,224 B2 * | 2/2020 | Carayon | B01D 33/073 |
| 10,589,201 B2 * | 3/2020 | Larsson | B01D 33/50 |
| 10,729,994 B2 * | 8/2020 | Svensson | B01D 33/42 |
| 10,792,595 B2 * | 10/2020 | Van den Berg | B01D 33/807 |
| 10,843,230 B2 * | 11/2020 | Wojciechowski | B29C 65/16 |
| 10,888,807 B2 * | 1/2021 | Harden | B01D 33/23 |
| 2007/0151920 A1 * | 7/2007 | Kay | B01D 29/012 210/500.1 |
| 2011/0094950 A1 * | 4/2011 | Dahl | B07B 1/4672 210/85 |
| 2011/0155653 A1 * | 6/2011 | Robertson | B07B 1/4663 209/408 |
| 2012/0006735 A1 * | 1/2012 | Ralph | B07B 1/4645 210/232 |
| 2012/0080362 A1 * | 4/2012 | Trench | B07B 1/4645 209/405 |
| 2013/0032515 A1 * | 2/2013 | Carayon | B01D 33/801 210/158 |
| 2013/0277281 A1 * | 10/2013 | McClung, III | B07B 1/46 209/346 |
| 2013/0277282 A1 * | 10/2013 | Lipa | B07B 1/4609 209/392 |
| 2013/0313168 A1 * | 11/2013 | Wojciechowski | B07B 1/4618 209/275 |
| 2014/0054244 A1 * | 2/2014 | Towers | B01D 33/333 210/767 |
| 2014/0262978 A1 * | 9/2014 | Wojciechowski | B07B 1/4618 209/397 |
| 2015/0239014 A1 * | 8/2015 | Lipa | B07B 1/4609 209/392 |
| 2015/0283583 A1 * | 10/2015 | Woodgate | B07B 1/4609 209/363 |
| 2016/0052022 A1 * | 2/2016 | Dahl | B07B 1/4645 209/408 |
| 2016/0101377 A1 * | 4/2016 | Cady | B01D 29/012 210/335 |
| 2016/0303611 A1 * | 10/2016 | Lipa | B07B 1/4609 |
| 2017/0036143 A1 * | 2/2017 | Van den Berg | C02F 1/001 |
| 2017/0157540 A1 * | 6/2017 | Svensson | C02F 1/001 |
| 2018/0071663 A1 * | 3/2018 | Carayon | B01D 33/073 |
| 2018/0178147 A1 * | 6/2018 | Thysell | B01D 25/215 |
| 2018/0185879 A1 * | 7/2018 | Torres Jara | B07B 1/22 |
| 2018/0185880 A1 * | 7/2018 | Wojciechowski | B07B 1/469 |
| 2018/0243797 A1 * | 8/2018 | Wojciechowski | B29C 65/16 |
| 2018/0312667 A1 * | 11/2018 | Colgrove | C08G 18/4277 |
| 2018/0345319 A1 * | 12/2018 | Colgrove | B07B 1/46 |
| 2019/0076881 A1 * | 3/2019 | Colgrove | B07B 1/185 |
| 2019/0193004 A1 * | 6/2019 | Carayon | E03F 5/14 |

(56) References Cited

U.S. PATENT DOCUMENTS

2019/0224597 A1\* 7/2019 Harden .................. B01D 36/04
2019/0329293 A1\* 10/2019 Colgrove .............. B07B 1/4618

FOREIGN PATENT DOCUMENTS

| EP | 3313547 B1 \* | 6/2020 | ............. B01D 33/23 |
|----|----|----|----|
| FR | 403107 | 10/1909 | |
| JP | 1973-064563 A | 9/1973 | |
| JP | 52-009839 A | 8/1977 | |
| JP | 1989-501765 A | 6/1989 | |
| KR | 101009439 B1 | 1/2011 | |
| WO | 8704474 | 7/1987 | |
| WO | 9117808 | 11/1991 | |
| WO | WO-2016207143 A1 \* | 12/2016 | |

\* cited by examiner

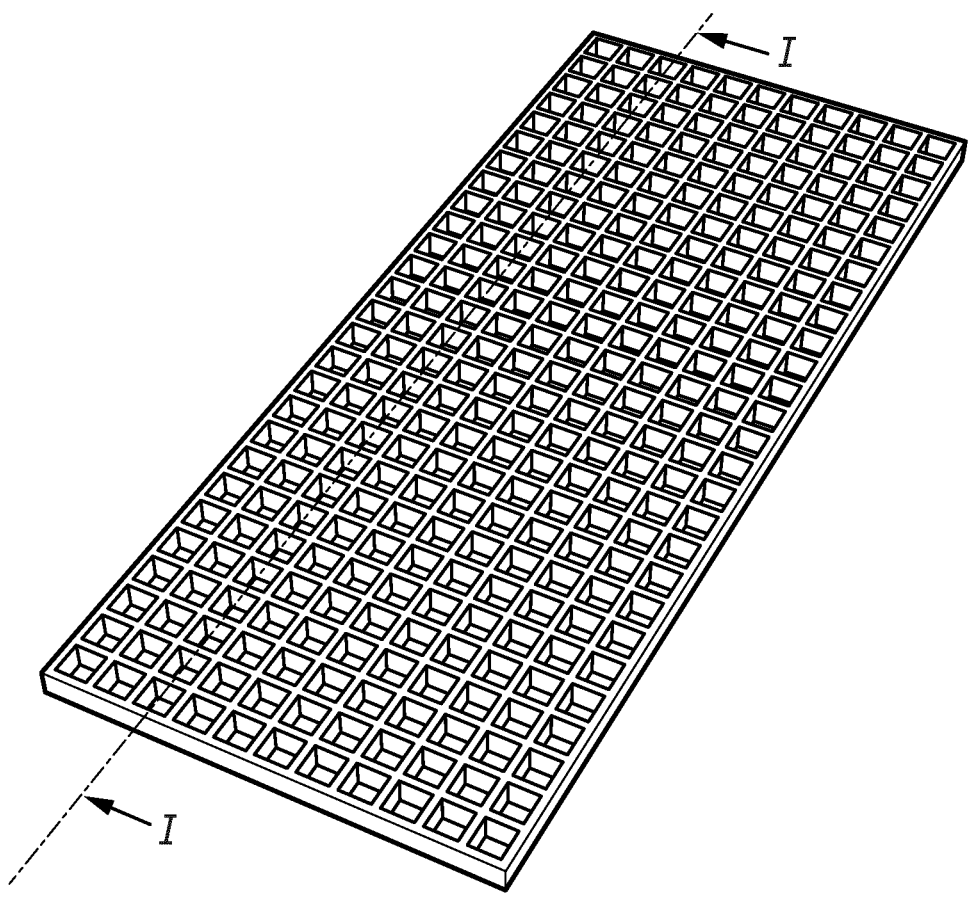
(Prior art) *Fig. 1a*
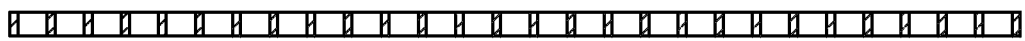
I-I
(Prior art) *Fig. 1b*

FILTER PANEL WITH STRUCTURES SUPPORT GRID AND DRUM FILTER WITH SAID FILTER PANEL

RELATED APPLICATIONS

The present application is a U.S. National Stage Application of PCT Application No. PCT/EP2016/064272, with an international filing date of Jun. 21, 2016. Applicant claims priority based on Swedish Patent Application No. 1550862-5 filed Jun. 23, 2015. The subject matter of these applications is incorporated herein in their entirety.

TECHNICAL FIELD

The invention relates to a filter panel for a drum filter which is used for filtering off solid particles from a liquid. The invention also relates to a drum filter for filtering liquid.

BACKGROUND ART

Filter cloths are today employed in many different applications for separating solid particles from liquids, e.g. in liquid purification. The filter cloth is often disposed horizontally or freely suspended at an angle. A big problem in the context is the reduced flow capacity resulting from surface tensions present in the liquid phase and generated on the underside of the filter cloth. In order to break these surface tensions, ribs transversal to the flow direction are often mounted on the underside of the filter cloth. However, this measure does not solve the flow problem in a satisfactory manner. Another serious disadvantage of known filter systems is that the entire cloth must be replaced in case it is damaged, which is a complicated, time-wasting and expensive operation because the cloth is usually mounted in a frame.

A filter panel on which a filter cloth is disposed and which is used for filtering off solid particles from a liquid is previously known through WO8808739. The filter cloth is attached to the underlying filter panel, preferably by gluing or welding, along essentially the whole contact surface of the filter cloth with the filter panel. The filter panel has a large number of apertures, and if the filter cloth is damaged, the filter panel apertures coincident with the position of the damage on the cloth can easily be plugged, without necessitating replacement of the entire filter cloth.

There are, however, problems associated with the solution described above. During use, the apertures of the filter panels will be filled with liquid, and part of this liquid will be carried by the sides of the apertures and will follow the filter panel up above the liquid level towards and into the collecting channel that collects the solid particles to be filtered from the liquid. Thus, this part of the liquid will not be filtered but instead follow the solid particles out of the drum via the collecting channel. This decreases the effect of the filtration by carrying unnecessarily unfiltrated liquid outside of the drum with the solid particles removed.

SUMMARY OF THE INVENTION

It is an objective of the present invention to provide an improvement of the above technique and prior art. More particularly, it is an objective of this invention to provide an improved filter panel for a drum filter which is used for filtering off solid particles from a liquid.

According to a first aspect, these and other objects, and/or advantages that will be apparent from the following description of embodiments, are achieved, in full or at least in part, by a filter panel for a drum filter which is used for filtering off solid particles from a liquid. The filter panel comprises a first side being adapted to be attached to a drum of said drum filter, a second side being adapted to receive a filter cloth, and a plurality of through holes extending from said first side to said second side, each hole defining one or more side walls. The filter panel is characterized in that at least one of said holes comprises an inclined side wall. By inclining the side walls of the holes, the liquid lift of the filter panel may be controlled and adapted for the specific drum filter to which it has been attached. To solve the problem stated above, the side walls may be inclined in a manner so that the liquid lift of the filter panel is reduced. In turn, the amount of unfiltered liquid escaping from the drum via the collecting channel will be heavily reduced. In some other drum filters, it may be desirable to increase the liquid lift, which easily is achieved by simply turning the filter panels on the drum filter over. This could, for example, be desirable when filtering large particles from the liquid which are intended to get stuck on the side wall of the holes of the filter panel and follow the same up and into the collecting channel. In turn, the collecting channel could potentially be placed at a higher level within the drum so that the active filtering area of the same may be increased.

Naturally, different embodiments of the filter panel are possible. In one embodiment, the majority of the holes may comprise an inclined side wall. In another embodiment, all of said holes comprise an inclined side wall. In the most preferred embodiment, each hole may have four side walls, of which two opposing side walls are inclined.

The filter panel extends in a length direction, a width direction, and a depth direction, wherein the inclined side wall or side walls form an angle with said depth direction. The angle may be between 10° and 60°, more preferably between 20° and 50°, and most preferably between 30° and 40°. Naturally, the angle may be varied for different holes and/or for different filter panels based on the requested degree of liquid lift in the drum filter. The same applies for the size and shape of the filter panel. This is advantageous in that the filter panel may be adapted for use in a specific drum filter and/or in relation to the size of the particles in the liquid to be filtered.

The filter panel is preferably manufactured by means of moulding and consists of a plastic material. The filter cloth may be glued or welded onto the filter panel.

According to a second aspect, these and other objects are achieved, in full or at least in part, by a drum filter for filtering liquid. The drum filter comprises a rotatable drum for receiving liquid to be filtered, a plurality of filter panels, each filter panel comprising a first side attached to said drum, a second side to which a filter cloth is attached, and a plurality of through holes extending from said first side to said second side. Each hole defines one or more side walls, at least one of which side walls being inclined. The liquid is filtered by flowing from said drum, through said holes in said filter panels and out of said filter cloth. The side walls may be inclined in a direction generally opposite to a direction of rotation of the drum or inclined generally in said direction of the rotation of the drum.

According to another embodiment, the drum filter comprises a drum for receiving liquid to be filtered and a drive for rotatively driving the drum. The drum includes a frame having openings therein, a plurality of filter panels secured to the frame of the drum and including an inner side and an outer side, and filter cloth disposed adjacent the outer side of the filter panels. The filter panels are disposed adjacent the openings in the frame of the drum and includes an array of openings with the openings including sidewalls such that liquid is filtered by the liquid flowing from the drum, through the openings in the filter panels and out the filter cloth. The sidewalls of the openings in the filter panels are inclined in a direction generally opposite to the direction of rotation of the drum or inclined generally in the direction of the rotation of the drum.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein:

FIG. 1a is a perspective view of a filter panel according to known prior art,

FIG. 1b is a cross sectional view of FIG. 1a,

DETAILED DESCRIPTION OF PREFERRED EMBODIMENTS OF THE INVENTION

In FIG. 1a and FIG. 1b, a conventional filter panel according to prior art is illustrated. The filter panel is adapted to be used in connection with a drum filter for filtering off solid particles from a liquid.

Figure 2A:
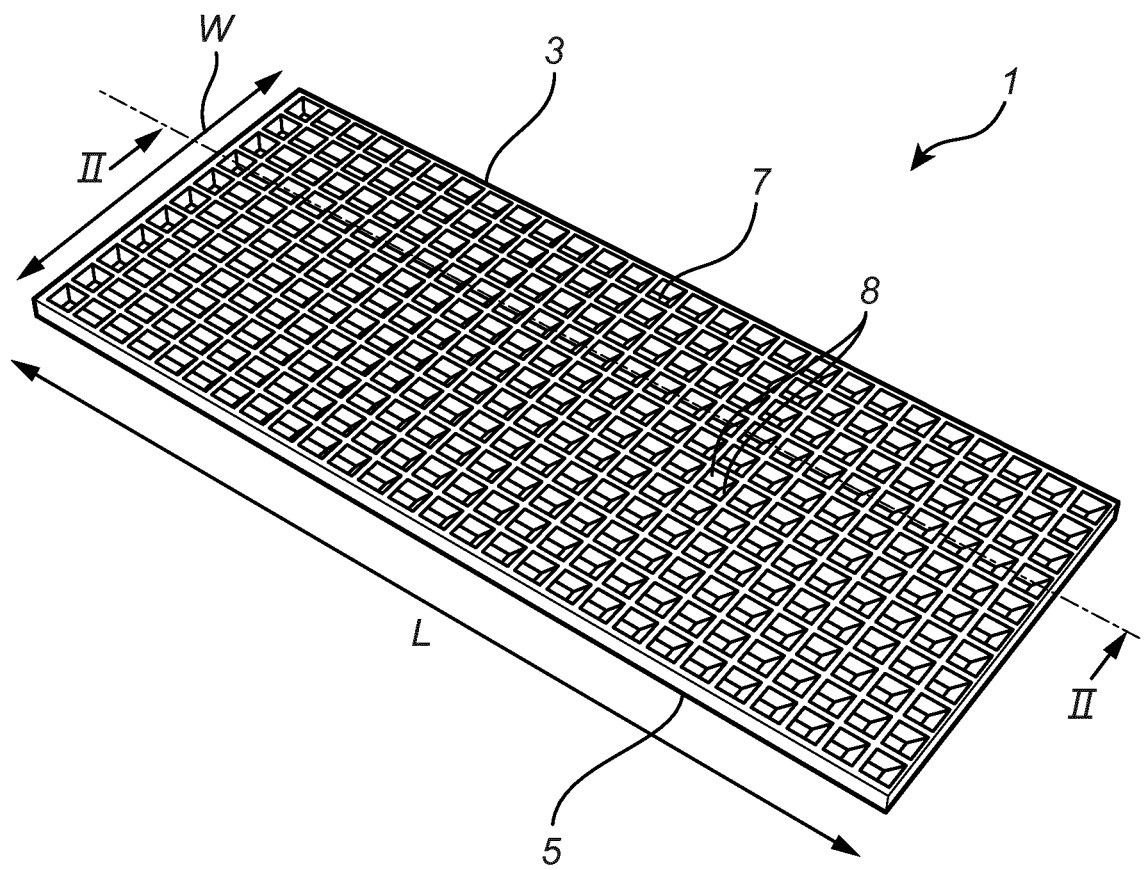
FIG. 2a is a perspective view of a filter panel according one exemplary embodiment of a first aspect of the present invention.
Figure 2B:
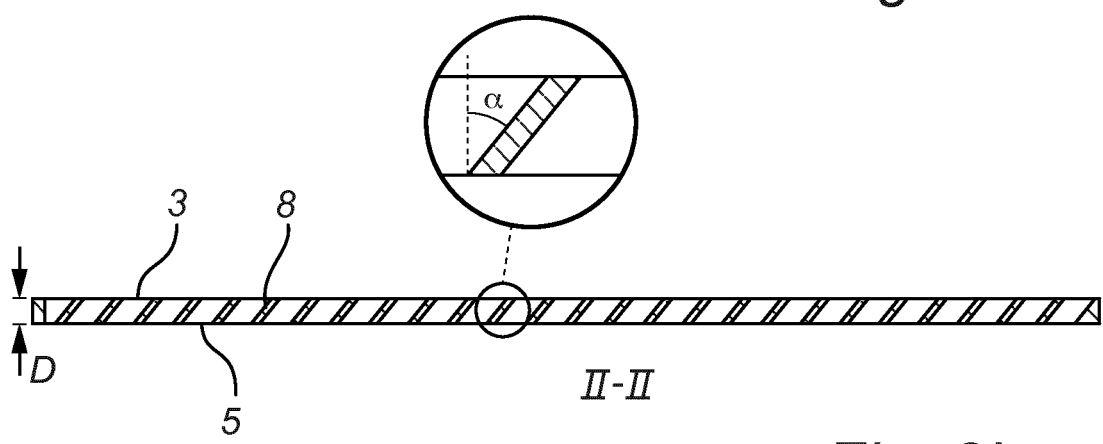
FIG. 2b is a cross sectional view of FIG. 2a, and FIG. 3 is a perspective view of a drum filter according one exemplary embodiment of a second aspect of the present invention.

FIG. 2a and FIG. 2b illustrates a filter panel 1 according to one exemplary embodiment of the present invention. The filter panel 1 is to be used in connection with a drum filter 2 for filtering off solid particles from a liquid. The filter panel 1 comprises a first side 3 which is adapted to be attached to a drum 4 of said drum filter 2, and a second side 5 which is adapted to receive a filter cloth 6. The filter panel 1 extends in a length direction L, a width direction W, and a depth direction D. The filter panel has a plurality of through holes 7 extending from the first side 3 to the second side 5. The through holes 7 are rectangular in shape and have four side walls 8. Two opposing side walls 8 of each hole 7 are inclined and form an angle α together with the depth direction D, preferably of about 30°. The remaining two side walls 8 of each hole are straight and thus form an angle of 90° with the depth direction D. The filter panel 1 is made of a plastic material and is manufactured by means of moulding. The filter panel 1 is releasably attached to the drum 4 of said drum filter 2 using any suitable mounting process, and in turn, the filter cloth 6 is preferably glued or welded to the filter panel 1 and has a mesh size of about 10-1000 μm.

Depending on the application and the type of solids in the liquid there is a need for different methods to catch the solids particles in the liquid. Large particles needs to be taken out with the filter panel 1 (high liquid lift) and small solids by the filter cloth 6 (low liquid lift). When there are no large particles in the liquid, it is desired to lift as little liquid as possible out of the system. With the filter panels 1 currently on the market there is no way to control or adjust the liquid lift.

By mounting the new filter panel 1 in different directions the amount of lifting capacity can be varied from a minimum of liquid lift up to a lift much higher than any filter panel 1 used today. On applications where the liquid is seen as an expensive resource it is crucial that the amount of liquid lost by lifting is minimized. A low lifting filter panel 1 will also result in lower energy requirements for treating the backwash water. On applications with large solids for example food pellets in aquaculture the filter panel 1 has to be able to dig the solids out of the drum 4.

Figure 3:
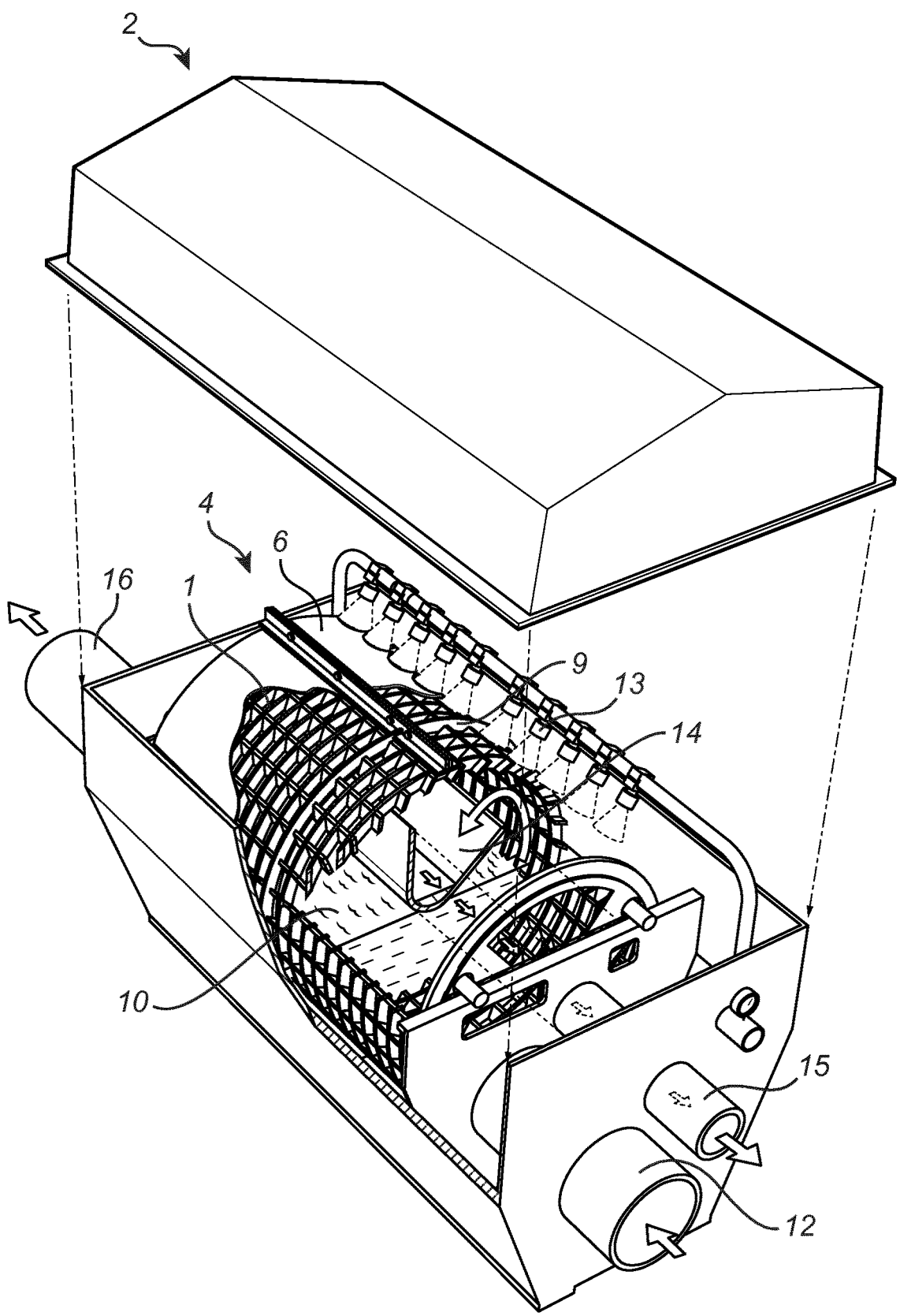

In FIG. 3, a drum filter 2 according to one exemplary embodiment of the present invention is illustrated. The drum filter 2 comprises a drum 4 for receiving liquid to be filtered and a drive (not shown) for rotatively driving the drum 4. The drum 4 includes a frame 9 having openings 10 therein, and a plurality of filter panels 1 secured to the frame 9 of the drum 4 and including an inner side 3 and an outer side 5. A filter cloth 6 is disposed adjacent the outer side 5 of the filter panels 1. The filter panels 1 are disposed adjacent the openings 10 in the frame 9 of the drum 4 and including an array of openings 7 with the openings 7 including sidewalls 8 such that liquid is filtered by the liquid flowing from the drum 4, through the openings 7 in the filter panels 1 and out the filter cloth 6. The sidewalls 8 of the openings 7 in the filter panels 1 are inclined in a direction generally opposite to the direction of rotation of the drum 4 or inclined generally in the direction of the rotation of the drum 4.

During use, liquid is supplied into the drum 4 of the drum filter 2 through a liquid inlet 12. From there, the liquid flows from the drum 4, through the openings 7 in the filter panels 1 and out of the filter cloth 6. The small particles in the liquid will attach to the filter cloth 6 and thus follow the rotating drum up and above the liquid level in the drum filter 2. When the filter cloth 6 reaches a certain predetermined level in the drum filter 2, the filter cloth 6 is backwashed by means of a plurality of nozzles 13 so that the particles attached to the filter cloth 6 are washed of the same and into a collecting channel 14 arranged within the drum 4. The particles are then transported out of the drum 4 and the drum filter 2 via an outlet 15. Larger particles in the liquid will get stuck in the filter panel 1 itself and then follow the same procedure as the smaller particles in order to end up in the collecting channel 14 and be transported out of the drum 4 and the drum filter 2 via the outlet 15. The filtered liquid leaves the drum filter 2 through a liquid outlet 16.

In the present invention, the filter cloth 6 is attached to the underlying filter panel 6, preferably by gluing or welding, along essentially the whole contact surface of the filter cloth 6 with the filter panel 1. Another advantage of the present invention is that the filter panel 1 is easy to mount in a drum filter 2 since the filter panel 1 and the filter cloth 6 may form an integral part.

The skilled person realizes that a number of modifications of the embodiments described herein are possible without departing from the scope of the invention, which is defined in the appended claims.

For instance, the size and shape of the filter panel 1 may be varied in any suitable way to achieve the objects stated above. The same applies to the further components of the drum filter 2.

The invention claimed is:

1. A rotating drum filter for receiving liquid to be filtered comprising:
   a rotating drum frame having openings therein;
   a plurality of filter panels secured to the drum frame and rotatable with the drum frame;
   the filter panels including first and second sides;
   filter cloths secured to one side of the filter panels for filtering liquid passing from the drum filter through the filter panels;
   a plurality of through holes extending through the filter panels through which the liquid passes as the drum filter filters the liquid;
   each through hole having four side walls, the four side walls including two opposed inclined side walls;
   wherein the two opposed inclined side walls of the through holes are inclined in a direction generally opposite to the direction of rotation of the drum frame or inclined generally in the direction of the rotation of the drum frame; and
   wherein the drum filter is configured to filter the liquid received by the drum filter by passing the liquid out of the drum filter through the filter panels and the filter cloth.

2. The rotating drum filter of claim 1 wherein in a first orientation, the two opposed inclined side walls of the through holes reduces liquid lift as the drum frame rotates; and wherein in a second orientation, the two opposed inclined side walls of the through holes increases the liquid lift as the drum frame rotates.

3. A method of filtering liquid with a rotating drum filter, comprising:
   directing the liquid to be filtered into the drum filter having a drum frame and a plurality of filter panels secured to the drum frame, the filter panels including a plurality of through holes where the through holes include four side walls and the four side walls of each through hole includes two opposed inclined side walls;
   filtering the liquid within the drum filter by directing the liquid from inside the drum filter through the filter panels and through filter cloth attached to the filtered panels;
   rotating the drum filter and the filter panels; and
   adjusting or controlling the liquid lift caused by the filter panels as the drum filter rotates by orienting the filter panels such that in a first orientation the two opposed inclined side walls of the through holes are inclined in a direction generally opposite the direction of rotation of the drum filter or in a second orientation where the two opposed inclined side walls of the through holes are inclined generally in the direction of the rotation of the drum filter.

4. The method of claim 3 wherein the filter panels include first and second sides and wherein in the first orientation the first side of the filter panel faces the interior of the drum filter and wherein the second orientation the second side of the filter panels faces towards the interior of the drum filter.

5. The method of claim 3 including reducing or minimizing the liquid lift of the filter panels by orienting the filter panels such that the two opposed inclined side walls of the through holes are inclined in the general direction of the rotation of the drum; or increasing the liquid lift of the filter panels by orienting the filter panels such that the two opposed inclined side walls of the through holes are inclined in a direction generally opposite to the direction of rotation of the drum filter.

* * * * *